(12) United States Patent
Lannestedt et al.

(10) Patent No.: US 6,707,044 B2
(45) Date of Patent: Mar. 16, 2004

(54) INFRARED CAMERA SYSTEM

(75) Inventors: S. Tomas Lannestedt, Alvsjo (SE); R. Mikael Eriksson, Vaxholm (SE); Jonce Kotaleski, Solna (SE); Mats A. Henriksson, Taby (SE); Roger L. Persson, Marsta (SE)

(73) Assignee: Flir Systems AB, Danderyd (SE)

( * ) Notice: Subject to any disclaimer, the term of this patent is extended or adjusted under 35 U.S.C. 154(b) by 215 days.

(21) Appl. No.: 09/849,524

(22) Filed: May 7, 2001

(65) Prior Publication Data

US 2002/0162963 A1 Nov. 7, 2002

(51) Int. Cl.[7] .................................................. G01J 5/08
(52) U.S. Cl. ..................................... 250/351; 250/338.1
(58) Field of Search ............................... 250/351, 338.1, 250/336.1

(56) References Cited

U.S. PATENT DOCUMENTS

| | | |
|---|---|---|
| 2,357,193 A | 8/1944 | Harrison |
| 3,978,281 A | 8/1976 | Burrer |
| 4,670,653 A | 6/1987 | McConkle et al. |
| 5,127,742 A | 7/1992 | Fraden |
| 5,196,106 A | 3/1993 | DuPree et al. |
| 5,227,782 A | 7/1993 | Nelson |
| 5,298,752 A | 3/1994 | Wight |
| 5,315,116 A | 5/1994 | DuPree et al. |
| 5,994,702 A | 11/1999 | Clynne et al. |
| 6,144,031 A | 11/2000 | Herring et al. |

FOREIGN PATENT DOCUMENTS

| | | |
|---|---|---|
| EP | 0 417 791 A2 | 3/1991 |
| EP | 0 992 773 A2 | 4/2000 |
| GB | 2115143 A | 9/1983 |

*Primary Examiner*—David Porta
*Assistant Examiner*—Christine Sung
(74) *Attorney, Agent, or Firm*—Young & Thompson

(57) ABSTRACT

An IR camera comprises an IR Focal Plane Array having a number of detector elements as sensor devices, an optical system focusing an object onto the Focal Plane Array, and a signal processing system connected to the Focal Plane Array. The camera also has a modular structure comprising a camera housing provided with the Focal Plane Array and the signal processing system, an absorbent/emitting shielding device connected to the camera housing, and an optical focusing system removably mounted to the shielding device.

58 Claims, 4 Drawing Sheets

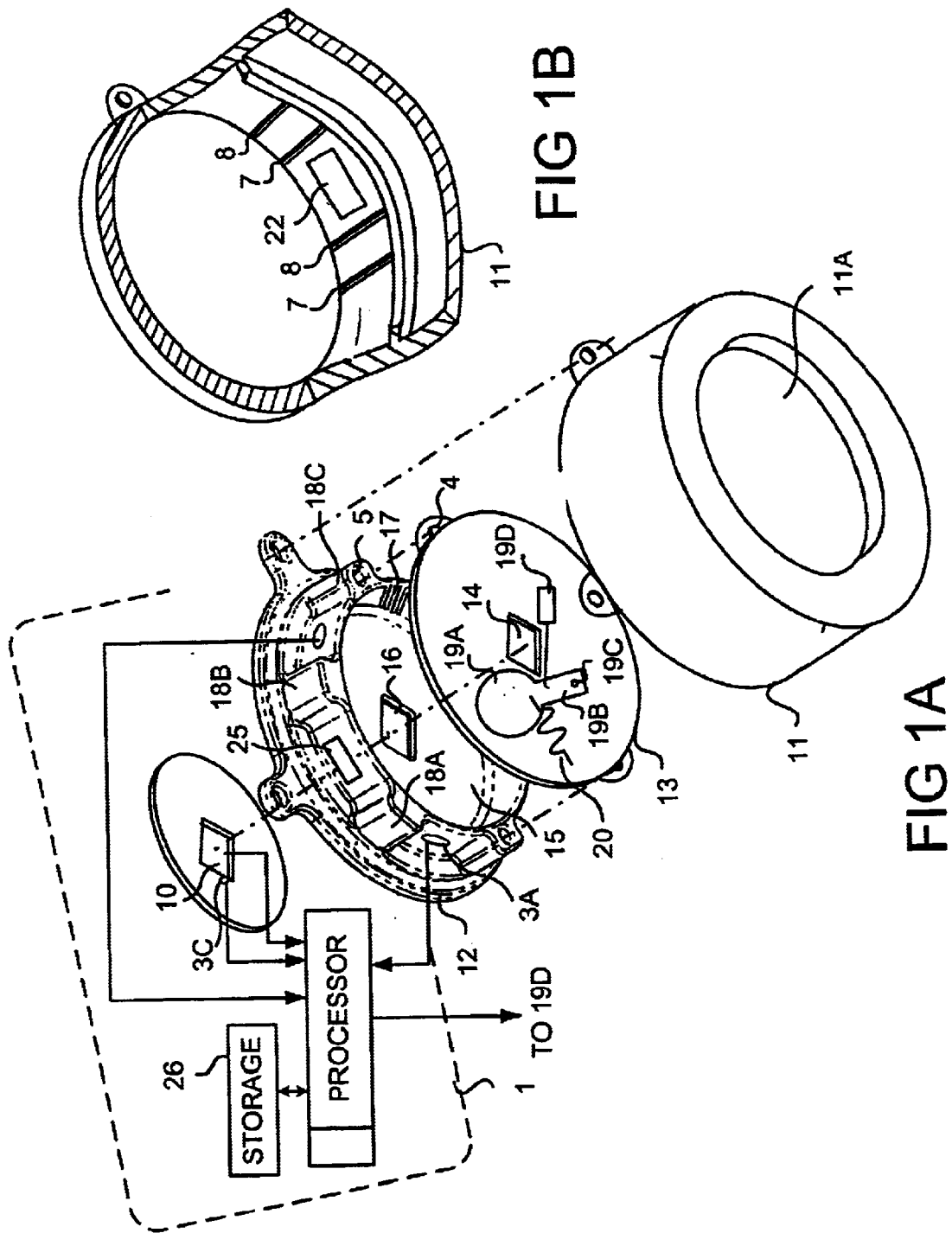

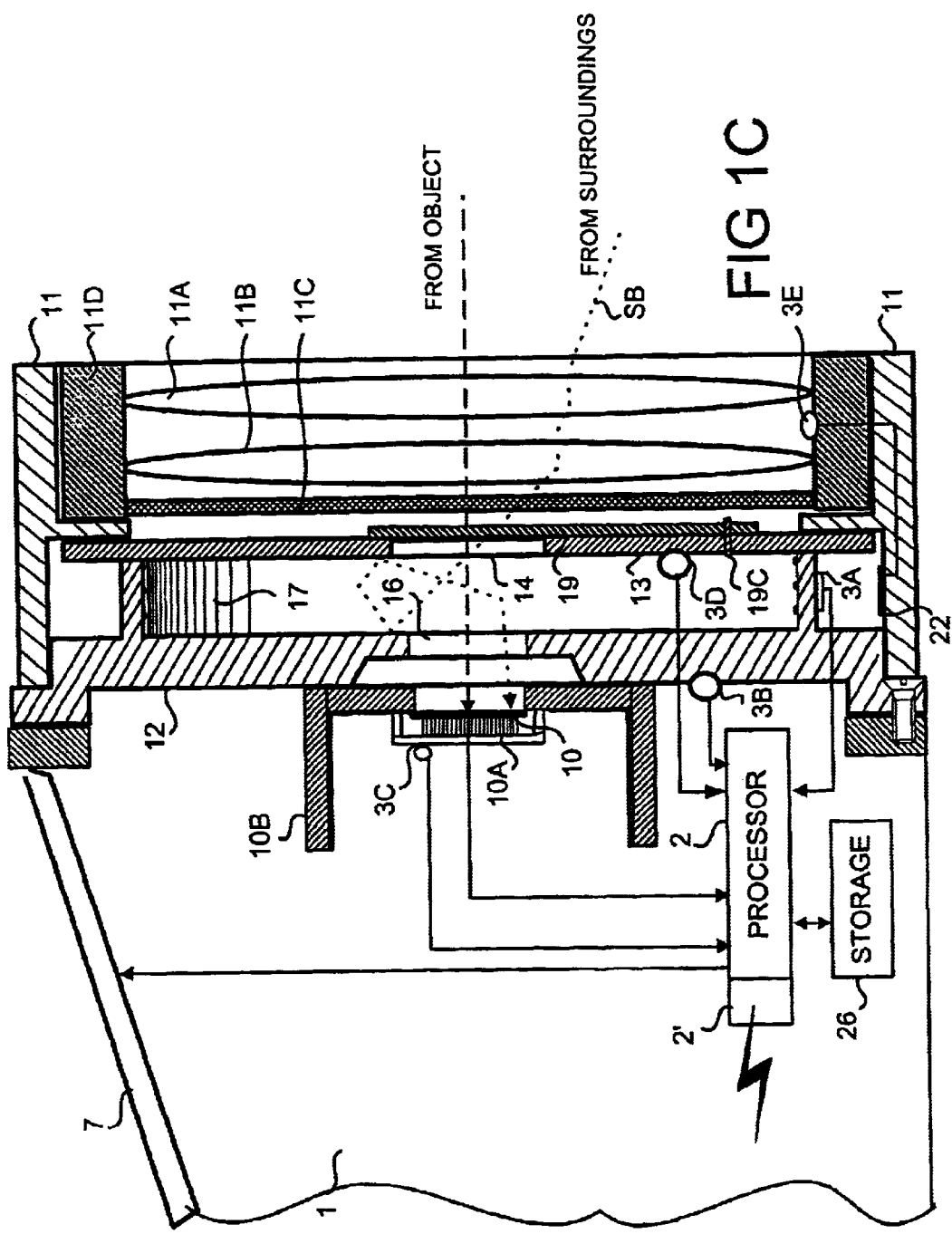

INFRARED CAMERA SYSTEM

BACKGROUND OF THE INVENTION

1. Field of the Invention

This invention relates to an infrared camera system having an array of sensor element, called Focal Plane Array (FPA), and its design. It also relates to the heat transform in the camera.

The invention also relates to an absorbent/emitting shielding, a shutter without position sensor provided in the system, and data/information regarding different optical elements to be connected to the system. It also relates to the design of the coupling between the FPA and the absorbent shielding.

The camera also comprises a signal processing system connected to the FPA. The processing system is provided with a program to adapt the interpretation of the signals from each detector element to features in the surrounding of the FPA, and means to feed information about amended features in the surrounding to the signal processing system.

2. Description of the Related Art

IR-cameras are usually very expensive devices, since their manufacture is rather complicated and need individual mechanical adjustments. There is a need for inexpensive and exact IR-cameras, particularly of the temperature measuring kind. There is also a need for an IR-camera, which allows the user to exchange parts of it himself and make smaller adjustments.

IR-cameras need to be calibrated. This is particularly true for IR-cameras having an array of sensor elements, such as a focal plane array (FPA), preferably of the un-cooled type, i.e. cameras with a small amount of movable elements. One strives to have as few movable elements as possible and also to have as few elements as possible in the system that are dependent upon the mechanical position particularly of moving parts.

Calibration of an IR camera is commonly done at the manufacturer. Normally, a re-calibration must be done as soon as an exchange of some vital optical elements have been done, or some movable parts have been displaced. Therefore, the camera has up to now been sent to the manufacturer in order to make this re-calibration. This is a drawback for the users of the camera and there is a wish to provide a system, in which the calibration could be made in an easy way, preferably automatically.

Since it is a camera having an IR recording made by a non-moving sensor system the calibration is provided on the signals from the individual sensor elements in the FPA.

To ensure that the image quality and/or temperature measurement accuracy is good enough the infrared camera system has to compensate for several factors associated to the optical concept. For example it can be parameters that compensate for non-uniformity, transmission loss, vignetting, different lens temperatures, spectral characteristics and other features.

Another problem is that IR cameras using any shuttering/flag device to normalize or calibrate the infrared image information from the detector need to know when the shuttering device is in the optical path, protecting the detector from detecting radiation from objects outside the system, to be able to calibrate. The standard solution to this is to have sensors of various kinds detecting the position/location of the shuttering device. Another solution is to wait during a predetermined time after activating the shuttering device. This makes the normalization and calibration time rather long.

The fact that the presented image and temperature values must first be compensated for the different lenses and filters used has several drawbacks. The user of infrared cameras needs to send the system for calibration if he/she gets a new lens or filter.

The need and design of an absorbent shielding in IR-cameras is well known. Un-cooled FPA detector elements have to be kept at a stable temperature, defined within some range, emerging from IR radiation and the internal heat generated by the electronic circuits inside the IR camera. There have always needed to be some heat sink between the FPA and the camera housing in order to get rid of the excessive heat. The heat sink solutions so far are accompanied with mechanical mounting and time consuming alignment difficulties, which earlier had to be made by the manufacturer. The detector and FPA housing are very sensitive for any pressure changes due to heat expansion of the mounting of the heat sink and the camera housing. The changes are detected as flames in the IR image.

The need and design of an absorbent shielding in IR cameras is well known. Unwanted IR radiation outside the focused IR energy from the system optics has to be either redirected away from the detector device or the FPA or to be absorbed by the inner housing by the baffles and absorbent shielding. Various designs exist with either very high demand on the emissivity of the inner surface and/or complicated geometry to eliminate stray light reaching the IR detector or FPA.

One common way to solve the problem with the shielding is to introduce several baffles at calculated intervals between the entrance aperture and the detector entrance window following the shape of the optical bundle. Such baffles are inserted during the manufacturing process and greatly increase the cost of the baffle. The inserted baffles should be infinitely thin since the edges give rise to an additional source of scattering.

There are some known shielding arrangements. U.S. Pat. Nos. 5,227,782 and 5,315,116 describe that any radiation outside the optical bundle could be reflected into an optical cavity and reflected out of the system after several surface reflections predicted by means of ray trace. Approach with advanced geometrical solutions to redirect or retro reflect the stray light back through the optics are described in U.S. Pat. Nos. 5,994,702 and 5,298,752. Approach with advanced absorbing surface cavities and microstructures are described in U.S. Pat. No. 5,196,106.

U.S. Pat. No. 6,144,031 describes a thin-walled shielding in front of an un-cooled infrared sensor, which can be of radiometric type. The shielding is comprised in a vacuum chamber together with the infrared sensor. The optics comprises a relay optic cell, which is fixedly mounted on the camera housing, and an imaging optical assembly, which is detachable, such as an assembly having a short focal length and an assembly having a long focal length can be interchanged. However, in each case the path of marginal rays leading from the relay cell entrance aperture to the FPA is unchanged.

SUMMARY OF THE INVENTION

An object according to the invention is to provide high precision IR cameras to a low cost and adapted to be produced in high volumes.

Another object of the invention is to provide IR cameras, which are self calibrated, or easily calibrated by the person handling the camera.

Still another object of the invention is to provide an IR camera, in which its different parts are easily exchangeable.

Another object of the invention is to provide an IR camera, in which it is ensured that the customer does not need to send the equipment away for calibration when he/she has acquired a new lens or filter. This will make it possible for the customer to start using the new lens/filter directly.

Still another object of the invention is to provide an IR camera, which makes the radiometry and the image calibration more accurate.

Another object of the invention is to provide an IR camera, in which the number of components and cost are reduced but which has an improved system performance.

Still another object of the invention is to provide an IR camera having a low cost absorbent shielding suitable for high volume IR cameras without sacrificing any considerable lost of measuring accuracy.

Yet another object of the invention is to provide an IR camera, in which the time consuming mounting and alignment procedure to the camera housing is avoided.

The invention relates to an IR camera comprising:
a. an IR Focal Plane Array comprising a number of detector elements as sensor means;
b. an optical system focusing an object onto said Focal Plane Array;
c. signal processing system connected to said Focal Plane Array;
d. a modular building comprising:
   d1. a camera housing provided with said Focal Plane Array and said signal processing system;
   d2. an absorbent/emitting shielding device connected to said camera housing; and
   d3. an optical focusing system being removably mounted to said shielding device.

The IR-camera further comprise:
program means in said processing system to adapt the signals from said detector elements in said Focal Plane Array to features in surroundings of said Focal Plane Array:
information means to feed information about amended features in said surroundings to said program means in said signal processing system.

The IR-camera could also comprise a Focal Plane Array holding device providing a thermal coupling directly from said Focal Plane Array to the absorbent shielding, and pressing means pressing said holding device against said shielding.

A cavity provides said absorbent shielding. It has a first aperture at one end wall turned to said Focal Plane Array, and a second aperture at another end wall for the beam path from said object to said Focal Plane Array. The cavity has a ratio of depth to width such that all stray light outside the optical path to the Focal Plane Array has to be reflected at least three times inside the cavity before it can go through the first aperture to reach the Focal Plane Array. The cavity is preferably approximately cylindrical, and the dimension of the cavity is at least 1 to 5 and has a radius being at least 3 times the width of any of the apertures. The Focal Plane Array has preferably a small size. A coating with a high absorption coefficient could be provided on an approximately cylindrical inside wall of the cavity. A simple wedge geometry of the inner cylindrical walls could further increase the absorption inside said cavity.

The holding device of the Focal Plane Array is pressed against the shielding, for example with screwed joint in order to provide direct thermal contact between two thermally conducting devices, for example metallic. Thus, according to one aspect of the invention the detector housing is floating in relation to the camera housing, to which it belongs. All the heat exchange is provided through the shielding and the radiation losses through the optics. This is in contrary to earlier solutions, where there has been a heat bridge between the enclosure for the Focal Plane Array and the camera housing in order to remove the excessive heat.

A shutter means may be provided between the optical focusing system and the Focal Plane Array.

By using the IR detector itself to detect when the detector signal has reached a predicted and/or steady state from the time the shutter close signal has been activated, there is no need for position sensors. It makes also a fast calibration since the waiting time from providing the shutter close signal until the steady state of the detector signal is optimal.

This method can be used even with a non-moving part shutter solution.

In one aspect of the invention the lens package or the filter is equipped with a device making it possible for the infrared camera to get the data associated with the lens/filter from the lens/filter itself. The data (information) stored using the device could be, but are not limited to, non-uniformity correction, transmission, vignetting parameters, compensation matrices, spectral characteristics, lens/filter part number, lens/filter serial number.

When the lens/filter is mounted to the infrared camera for the first time the camera automatically downloads (transfer) or interprets the data from the device integrated in the lens/filter and uses the new data to compensate for the specific characteristics of that lens/filter. The camera can, but does not have to, store the data so that next time the lens/filter is used and identified the data are already stored in the camera and do not need to be downloaded again. However, it is also possible to make the readings of the characteristics of the optics continuously. It is also possible to have the data on a card readable for the camera when inserted in a reading device in the camera.

The method for storing information about the lens/filter can be of any kind for example electronic device such as a memory, optic or magnetic (bar) code, mechanical part that makes it possible for the camera to identify specific information for the lens/filter.

With the data stored in the lens or filter there is no need to send the system for a complementary calibration. Also the customer will be able to acquire new types of lenses and filters that were not designed when he/she acquired the infrared camera. When he/she mounts the lens/filer to the camera for the first time the system will automatically read what type of lens or filter it is and what parameters the image and temperature measurement values should be corrected with.

The lens or filter could also be equipped with a temperature sensor in combination with the device storing the lens/filter data. The temperature sensor will then give the infrared camera information of the lens/filter temperature, which can be used for focus compensation, transmission compensation, which could be different for different temperatures, distance calculations etc.

The modular building of the IR-camera makes is easy both to manufacture and makes it easy to handle by the person handling the IR-camera.

Since all lenses are more or less unique, a solution in which every lens could have its own unique parameters stored with the lens identity so that the camera need not be sent away for calibration is a great benefit for the customer. Customer with more then one camera could save cost when it is possible to have the same lens for several cameras.

A customer who has more then one camera can save cost when different lens/filter can be used on all the cameras, i.e. when the lens/filter is no longer specific for the camera.

In combination with a temperature sensor mounted into the lens/filter the compensation of different parameters can be stored with a reference temperature.

The infrared camera is preferably handheld in order to point to different objects that have thermal anomalies or is to be inspected. The method to use such device to point out faulty parts or areas when performing inspections of electrical installation or buildings is easy to manage.

Both the shielding and shutter arrangements reduce the manufacturing cost for the camera.

BRIEF DESCRIPTION OF THE DRAWINGS

For a more complete understanding of the present invention and for further objects and advantages thereof, reference is now made to the following description of examples of embodiments thereof—as shown in the accompanying drawings, in which:

FIG. 1A shows an explosive view of an embodiment of the system according to the invention;

FIG. 1B shows a perspective view, partly in section, of the optics holder in FIG. 1A;

FIG. 1C shows a section through the system and shows the beam path of a ray outside the beam path from the object.

DETAILED DESCRIPTION OF PREFERRED EMBODIMENTS

Figure 3:
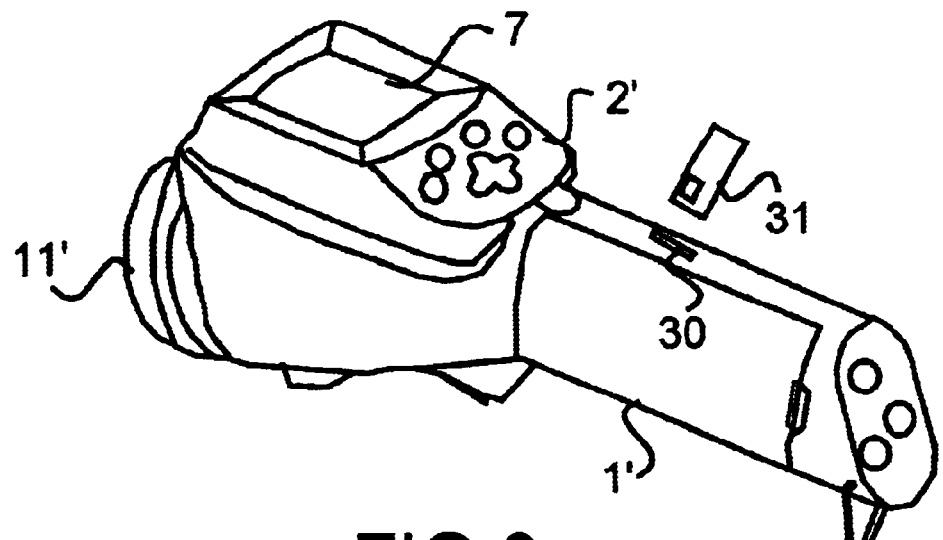
FIG. 3 shows a second embodiment of the invention.

Referring to FIGS. 1A, 1B, and 1C, an IR camera comprises an IR Focal Plane Array 10, below called FPA, as sensor means. The FPA comprises preferably microbolometers as sensor elements and is preferably of radiometric type, i.e. the sensed temperature is measured. An optical system, comprising lenses 11A, 11B, and a filter 11C, is inserted in an individual housing 11 for the optics and focuses an object (not shown) onto the Focal Plane Array 10.

THE MODULAR CONSTRUCTION

The IR camera is modularly built. The FPA 10 is provided in a camera housing 1, which does not include the optical focusing system as an integral part. An absorbent/emitting shielding 12 is preferably removably connected to the camera housing 1, for instance by being screwed onto the housing 1. The housing 11 for the optics is removably mounted to the shielding device 12 also for example by means of screws. A shutter arrangement disk 13 is provided between the optical focusing system and the Focal Plane Array 10 and is supported by the shielding device 12, e.g. by means of screws in protruding ears 4, 5 at the outside of the shielding device and the shutter arrangement disk 13 (shown only in FIG. 1A). The shutter arrangement provides a wall of the cave design of the sheilding device having an aperture for the beams from the camera objective.

A signal processing system 2, such as a computer, is connected to the FPA 10 in the camera housing 1. The processing system 2 comprises a software program, which adapts the signals from detector elements in the FPA to features in the surrounding of the FPA. The signal processing system can communicate with devices (not shown) outside the camera through a communication device 2'. The communication could be provided wirelessly by a communication link, as illustrated. The communication device 2' could also comprise a keyboard, through which the person handling the camera could enter control signals to the processing system 2. Sensors 3A, 3B, 3C, 3D, 3E feed information about amended features in the surrounding of the FPA 10 to the signal processing system 2. The sensors 3B, 3C, 3D, and 3E could be temperature sensors provided on the shielding device 12, the FPA 10, the shutter arrangement disk 13, and the lens system, respectively.

THE ABSORBENT SHIELDING 12

The absorbent shielding 12 eliminates the need of intermediate baffles or any other geometry between the entrance aperture 14 in the shutter arrangement 13 and the window 16 in front of the FPA 10. The absorbent shielding 12 comprises a cavity, which preferably is cylinder formed. It could also have a polygon-formed wall or the like. The window 16 is provided in one end wall 15 of the absorbent shielding 12. The other end wall of the shielding is provided by the shutter arrangement 13 with its aperture 14. All stray light outside the optical path to the FPA 10 has to be reflected at least three times inside the absorbent shielding before it can reach the FPA 10. The absorbent shielding has therefore an increased ratio of depth to diameter. The diameter is large in relation to the width of the beam path to the FPA 10, e.g. 5 times the width of the aperture 16. The choice of the ratio of the depth to diameter is made possible by choosing an FPA 10 having a small size.

Thus, the dimensioning of the shielding cavity is depending upon the depth, the radius of the cavity, and also upon the size of the FPA, because the intention is to force the beams having such an angle of incidence to the cavity that they do not reach the FPA directly to make at least three reflections inside the cavity before they could reach the FPA. This is achieved with a relation between the diameter in relation to depth of the cavity being greater than 5 and having a radius being at least 3 times the width of any of it apertures.

The inside baffle of the shielding cavity could preferably have a coating with a high absorption coefficient. Therefore, there is no considerable energy left after about three reflections against the cavity walls. FIG. 1C shows a section through the system according to the invention and shows an example of an off axis beam SB, which is reflected four times at different depth against the inside walls of the shielding before it has reached the FPA 10. The ratio depth/radius has been designed to reach the goal at least three reflections.

Figure 1D:
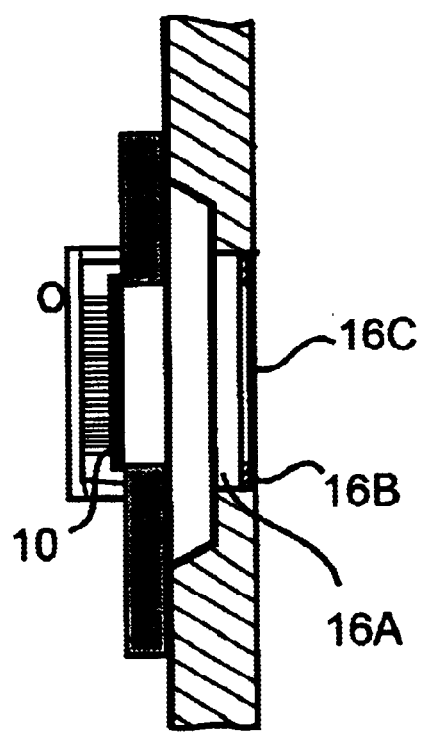
FIG. 1D shows a section through a part of the system showing another embodiment of the aperture in the shielding device.

Reflection from the edge of the aperture 16 could sometimes cause some problems. Depending on its size there will be a contribution to the image gradient in dependence of how black it is. If it is very black this contribution could be more or less neglected, but if the blackness has been deteriorated then there will be a problem. Thus, this problem will be increased with aging of the camera. As illustrated in FIG. 1D, this problem could be avoided if the size of the aperture opening 16A is increased in relation to the size shown in FIG. 1C and a thin plate 16B having an aperture 16C is inserted in the opening 16A.

In order to further increase the absorption of the inner cylindrical walls they could be a coated by a simple wedge geometry illustrated at 17. This geometry could be provided by simply threading the walls. The walls could thus be threaded vertically or horizontally or have a combination of such threads. Thereby a still better absorption could be reached. Such threading also means that the absorption coefficient of the coating of the inside walls is less critical. The multiple reflections at the inside walls of the absorbent shielding will thereby increase to at least five resulting in that practically no energy is left of the off axis rays.

The improvement of heat sink for the FPA 10 with its TE-cooler 10A is realized through a thermal coupling directly from the FPA 10 to the absorbent shielding 12, through a FPA holding device 10B. Thus, the holding device 10B is pressed against the shielding 12, for example with screwed joint from the shielding to the holding device (not shown). Therefore, it is direct thermal contact between two thermally leading devices, which are preferably metallic. Thus, according to one aspect of the invention the detector housing 10, 10A, 10B is floating in relation to the camera housing 1. All the heat exchange is provided through the shielding and the radiation losses through the optics.

This eliminates all previous solutions to the heat sink problem, which all resulted in mechanical systems having time consuming mounting and testing of the heat sink. Because of the inventive highly emissive absorbent shielding 12 the heat is emitted through it and the heat transparent optics 11A, 11B, 11C. The temperature of the FPA 10 and the absorbent shielding 12 is thereby kept at about the same temperature with a very small temperature gradient. The exchange of radiation between the absorbent shielding 12 and the FPA 10 is thereby kept low.

In order to keep track of the temperature differences the three temperature sensors 3B on the absorbent shielding, 3C at the FPA 10 (3C could in the practice be one particular of the sensor elements in the FPA), 3D provided on the shutter arrangement disc 13 in the vicinity of a shutter 19. The temperature of the shutter 19 is practically the same as the temperature of the shutter disc. The processing device 2 is provided with a program loop, which makes compensations of the signals from the FPA elements as a function of the measured temperatures. If the temperatures deviate from each other larger than a predetermined value, then an alarm signal could be set indicating that something wrong has occurred.

Thus measures have been provided in order to make the temperature inside the camera as alike as possible. Thus, also the absorbent shielding 12 is made rather massive having projections 18A, 18B, 18C etc. at some distances around its outside. The optics housing 11 is mounted onto the shielding projections, for example slipped or screwed. The optics housing 11 has therefore inwardly protruding guides 7, 8, one set for each outwardly protrusion 18A, 18B etc of the absorbent shielding, adapted to be set on each side of its protrusion. The temperature of the FPA 10 and the absorbent shielding 12 is thereby kept at the same temperature with a very low temperature gradient. The exchange of radiation between the absorbent shielding 12 and the FPA 10 is thereby kept low. This is achieved by having a high thermal mass and good thermal conduction of the absorbent shielding 12 at the same time as the shielding 12 is an emissive heat sink to the FPA 10.

Thus, the multiple choice of improvements stated above are all contributing to an excellent result. They incorporate in one single low-cost design for a dual purpose absorbent/emitting shielding suitable and necessary for high volume production. The design of the absorbent shielding 12 is easily built and could easily be manufacture either by casting or by welding some parts together. However, the design of the absorbent shielding is in fact based on a demand to be manufactured by casting in order to avoid high precision demands on the intermediate shielding.

THE SHUTTERING DEVICE

The IR camera uses a shuttering/flag device 19 to normalize or calibrate the infrared image information from the FPA 10. The shuttering/flag device 19 is formed like a spade having a round disk 19A on a handle 19B. The size of the disk 19A is such that it covers an area larger than the size of the aperture 14. The end of the handle turned from the disc is pivoting around an axis 19C. The device 19 is normally spring loaded by a draw spring 20 to be kept from covering the aperture 14. The spade 19A is drawn by a controllable draw element 19D to cover the aperture 14 at normalization or calibration procedure. This procedure is controlled by the processing device 2 at predetermined times or when needed in accordance with predetermined conditions.

However, there is a need to know when the shuttering/flag device 19 is completely in the optical path, protecting the FPA 10 from detecting radiation from objects outside the system, in order to be able to calibrate. According to one aspect of the invention, the FPA 10 itself or some part of it is used to detect when the signal from at least one detector element in the FPA 10 has reached a predicted and/or steady state from the time a shutter close signal has been activated. This avoids the need for position sensors for the spade, which otherwise cause trouble.

Instead of the movable shutter 19 a "non-moving part" shutter solution could be provided, i.e. a window comprising for example liquid crystals could be placed in the aperture 14. This window is normally transparent but can be controlled to be opaque when a calibration is to be done.

Figures 2A, 2B, 2C:
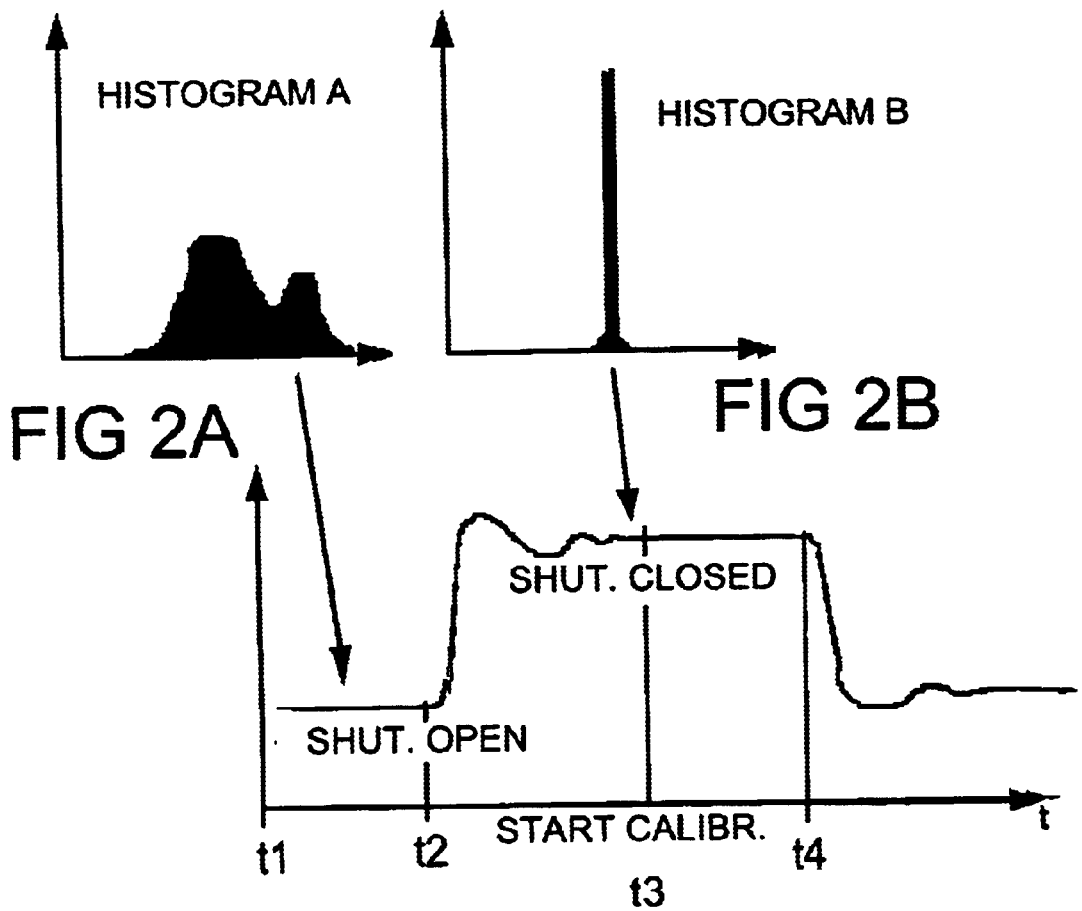
FIGS. 2A, 2B, 2C show diagrams to illustrate the function of a shutter in accordance with one aspect of the invention.

FIGS. 2A, 2B and 2C illustrate that the shutter function could be indicated by means of histograms. FIG. 2A illustrates the histogram of the signals from at least one sensor element of the FPA 10 at normal conditions, i.e. with the aperture 14 open and the camera looking at an object to be monitored or recorded. FIG. 2B illustrates the histogram from the signals from at least one sensor element of the FPA 10, or a combined signal from a few of them or from all, when the shutter is completely closed. It is to be observed that the aperture 14 is provided in a non-focused part of the beam path from the object to the FPA 10.

FIG. 2C illustrates the sub-area AVG-detector signal from at least one of the FPA sensor elements, from t1 to t2 when the shutter is open, from t2 to t3 when the shutter is closing to be closed, from t3 to t4 when the shutter is fully closed and the calibration and normalization measurement can take place, and from t4 and further on when the shutter 19 has been opened again. Thus, after that the control signal has been sent to the shutter control at t2, then the shutter system waits until the histogram in FIG. 2B has been reached, or when the signal in FIG. 2C has reached its continuous level at t3 after its building-up time between t2 and t3. Thereafter, the calibration or normalization is provided.

This kind of shutter procedure makes the calibration more accurate and fast than the common procedure where a predetermined delay time is provided after the control signal. The shutter procedure in accordance with this aspect of the invention thus gives an optimal calibration cycle time. It also can give an alarm if something has failed with the control of the shutter or a failure has been provided on the shutter itself, because the histogram and/or the signal will then be wrong. The shutter could have been bent or something like that such that radiation could come through the aperture 14 even if the shutter should be closed. The shutter 19 has very few parts and it needs very few adjustments in the production, which reduces manufacturing costs.

THE OPTICS HOUSING 11

The optics housing 11 comprising the lens package 11A, 11B and/or the filter 11C is in the embodiment shown in FIG. 1C equipped with at least one device 22 making it possible for the infrared camera to get data associated with optics. The device 22 is shown in the embodiment to be positioned in the lower part of the housing 11. However, information about the optics could also be placed on the optics itself, for example on its holder 11D. The data (information) provided on the optic system 11A, 11B, 11C using the device 22 could be, but are not limited to, non-uniformity correction, transmission, vignetting parameters, compensation matrixes, spectral characteristics, lens/filter part number, lens/filter serial number.

When the housing 11 comprising the optics 11A, 11B, 11C is mounted to the infrared camera for the first time the camera automatically downloads (transfers) or interprets the data from the device 22 integrated in the optics, for example the lens/filter system, and uses the new data to compensate for the specific characteristics of the optics. The optics could also be of the reflection kind using curved mirrors. The down-loading is provided from a small device 22, which could be a small sender, deriving the information about the optics inside the housing 11 and sending it over to at least one receiver 25 mounted between two of the projections 18A, 18B. The transmission between the device 22 and the receiver 25 is preferably non-wired. Thus, the method for storing information in the device 22 about the optics in the optics housing 11 can be of any kind for example electronic device such as a memory, optic or magnetic (bar) code, or a mechanical part that makes it possible for the camera to identify specific information for the optics. The received signal(s) are transferred from the receiver 25 to the processing device 2 in the camera housing 1. The processing device 2 can, but does not have to, store the data in its storage 26 so that next time the same optics is used and identified the data is already stored in the camera and does not need to be downloaded again.

It is of coarse possible to have a continuous reading of the optics parameters through the transmit/receive system 22 and 25. Also the temperature of the absorbent shielding 12 via a temperature sensor 3B could be read continuously. Also the temperature of the optics could be sensed continuously by a temperature sensor 3E and be transferred through the transmit/receive system 22 and 25, which can in combination with the device store the lens/filter data. The temperature sensor 3E will thus give the infrared camera information of the lens/filter temperature, which can be used for focal compensation, transmission compensation, which is different for different temperatures, distance calculations, different refractive index for different temperatures etc.

Thus, the continuous reading of the optics and its temperature could be provided. The sending from the sender 22 could be such that the parameters are changed in dependence of the temperature. The program in the processing device 2 could make such a calculation using the data about and the temperature of the optics.

The storage 26 used for storing the optics data can be any suitable electronic device such as a fixed but erasable memory, $e^2$-prom or the like.

With the data stored in the lens or filter, or other kind of optics, such as a reflecting system, there is no need to send the whole camera system for a complementary calibration. Also the customer will be able to acquire new types of lenses and filters that were not yet designed when he/she acquired the infrared camera. When he/she mounts the optics to the camera for the first time the system shown in the embodiment shown in FIG. 1C will automatically read what type of lens or filter it is. The program in the processing device 2 will calculate what parameters the image and temperature measurement values should be corrected with. The processing device 2 then makes the necessary amendments in the interpretation of the signals from each of the sensor elements in the FPA 10. The processing device 2 then presents the calculated image on a display 7.

The advantage of having the information about the optics is that the user of the camera does not keep track of what optics belongs to what camera. However, this feature could be provided in other ways. FIG. 3 illustrates an embodiment, in which the optics with its optics housing 11' is mounted onto the camera. The camera housing 1' is provided with a reading device 30, in which a card having for example a magnetic strip or being a smart card 31 could be inserted. The card 30 is loaded with data about the optics and could be delivered together with the optics. It is however also possible to deliver a particular code with a new package of optics, which code the handling person of the camera can insert on the keyboard 2'. This code is then used by the processing device 2 to amend the signals from the FPA 10 in a suitable way in order to adapt the camera to the new optics.

Although the invention is described with respect to exemplary embodiments it should be understood that modifications can be made without departing from the scope thereof. Accordingly, the invention should not be considered to be limited to the described embodiments, but defined only by the following claims, which are intended to embrace all equivalents thereof.

What is claimed is:
1. An IR camera comprising:
   a. an IR Focal Plane Array comprising a number of detector elements as sensor means;
   b. an optical system focusing an object onto said Focal Plane Array;
   c. a signal processing system connected to said Focal Plane Array;
   d. a modular construction comprising:
      d1. a camera housing provided with said Focal Plane Array and said signal processing system;
      d2. an absorbent and emitting shielding device connected to said camera housing; and
      d3. an optical focusing system being removably mounted to said shielding device,
      wherein said optical focusing system comprises:
         a storage element containing calibration information about at least one component of the optical focusing system;
         downloading means adapted to download a signal based on the stored calibration information and to transfer the calibration information to said processing device; and
         adjustment means adapted to adjust said infrared camera making use of said calibration information.
2. An IR camera according to claim 1, further comprising: program means in said processing system to adapt the signals from said detector elements in said Focal Plane Array to features in surroundings of said Focal Plane Array;

information means to feed information about amended features in said surroundings to said program means in said signal processing system.

3. An IR camera according to claim 1, comprising
a Focal Plane Array holding device providing a thermal coupling directly from said Focal Plane Array to said absorbent and emitting shielding;
pressing means pressing said holding device against said shielding.

4. An IR camera according to claim 1, comprising:
a cavity providing said absorbent and emitting shielding;
a first aperture at one end wall of said cavity turned to said Focal Plane Array;
a second aperture at another end wall of said cavity for the beam path from said object to said Focal Plane Array;
said cavity having a ratio of depth to width such that all stray light outside the optical path to said Focal Plane Array has to be reflected at least three times inside said cavity before it can go through said first aperture to reach said Focal Plane Array.

5. An IR camera according to claim 4, wherein
said cavity comprises an approximately cylindrical internal wall;
the dimension of said cavity having a relation between the diameter in relation to depth of said cavity being greater than 5 and having a radius being at least 3 times the width of any of said apertures.

6. An IR camera according to claim 5, comprising a wedge geometry of an inside cylindrical wall to increase absorption inside said cavity.

7. An IR camera according to claim 4, wherein said shielding comprises said cylindrical internal wall and said end wall comprising said first aperture as an integral piece adapted to be cast.

8. An IR camera according to claim 4, comprising a coating with a high absorption coefficient on a cylindrical inside wall of said cavity.

9. An IR camera according to claim 1, comprising:
a normally open shutter between said optical focusing system and said Focal Plane Array;
activating means for providing a shutter close signal;
shutter means for closing the beam path from said object to said focal plane array after receiving said shutter close signal; and
indicating means indicating that at least one detector element in said Focal Plane Array has a steady state signal after that said shutter close signal has been provided.

10. An IR camera according to claim 9, wherein said indicating means is adapted to indicating a predetermined histogram design representing said steady state signal from said at least one detector element.

11. An IR camera according to claim 1, comprising:
storing means storing computed information based on said downloaded signal; and
restoring means restoring said stored information when said at least one component is inserted again into the IR camera after having been removed from the IR camera.

12. An IR camera according to claim 1, wherein the adjustment means is adapted to adjust said Focal Plane Array making use of said calibration information.

13. An IR camera according to claim 12, comprising:
storing means storing computed information based on said downloaded signal; and
restoring means restoring said stored information when said at least one component is inserted again into the IR camera after having been removed from the IR camera.

14. An IR camera according to claim 1, wherein
said optical focusing system is an exchangeable kind of system provided with a code,
code reading means is provided for reading said code and adjusting calibration of said IR camera by making use of said code.

15. An IR camera according to claim 1, wherein said calibration information relates to at least one of the following features:
non-uniformity corrections;
transmission parameters;
vignetting parameters;
compensation matrixes;
special characteristics;
filter serial number;
filter part number;
lens part number; and
lens serial number.

16. An IR camera according to claim 1, comprising temperature sensor means providing calibration parameters for compensating optical features, such as focus, transmission, distance calculations.

17. An absorbent shielding provided in front of detector sensor means in an IR camera, comprising:
a cavity;
a first aperture at a first end wall of said cavity turned to said Focal Plane Array;
a second aperture at a second end wall of said cavity remote to said first end wall for the beam path from said object to said Focal Plane Array;
said cavity having a ratio of depth to width such that all stray light outside the optical path to said Focal Plane Array has to be reflected at least three times inside said cavity before it can go through said first aperture to reach said Focal Plane Array.

18. An absorbent shielding according to claim 17, wherein
said cavity has an approximately cylindrical internal wall;
the dimension of said cavity having a relation between the diameter in relation to depth of said cavity being greater than 5 and having a radius being at least 3 times the width of any of said apertures.

19. An absorbent shielding according to claim 17, comprising said cylindrical internal wall and said end wall comprising said first aperture as an integral piece adapted to be cast.

20. An absorbent shielding according to claim 17, comprising a coating with a high absorption coefficient on a cylindrical inside wall of said cavity.

21. An absorbent shielding according to claim 17, comprising a wedge geometry of said inner cylindrical walls to increase the absorption inside said cavity.

22. An absorbent shielding according to claim 17, comprising
a Focal Plane Array holding device in the vicinity of said first aperture providing a thermal coupling directly from a Focal Plane Array to said absorbent shielding;
pressing means pressing said holding device against said shielding.

23. A shutter for an IR camera an optical focusing system and a Focal Plane Array as detecting system for said camera, comprising:

activating means for providing a shutter close signal;

shutter closing means for closing the beam path from said object to said focal plane array after receiving said shutter close signal; and indicating means indicating that at least one detector element in said FPA has a steady state signal after that said shutter close signal has been provided, said indicating means is adapted to indicating a predetermined histogram design representing said steady state signal from said at least one detector element.

24. A shutter according to claim 23, wherein said indicating means is adapted to indicating a predetermined histogram design representing said steady state signal from said at least one detector element.

25. An optical focusing system for and IR camera including a Focal Plane Array as detecting system for said camera, comprising:

at least one storage means attached to the optical focusing system arranged to hold calibration parameters of the optical focusing system;

downloading means to download a signal based on the calibration parameters; and adjustment means to adjust said infrared camera making used of said downloaded signal;

wherein the optical focusing system is constructed and arranged to be removable.

26. An optical focusing system according to claim 25, wherein the optical focusing system comprises a plurality of optical components, each of said optical components comprising a respective one of the storage means;

said downloading means being adapted to download said signal from each of said storage means and to transfer it to a processing device;

said processing device is adapted to adjust signals from detector elements in said Focal Plane Array in relation to said downloaded signals.

27. An optical focusing system according to claim 26, wherein said optical component is an exchangeable kind of component provided with a code, code reading means is provided for reading said code and adjusting calibration of said IR camera by making use of said code.

28. An optical focusing system according to claim 25, wherein said calibration parameters relate to at least one of the following features:

non-uniformity corrections;

transmission parameters;

vignetting parameters;

compensation matrixes;

special characteristics;

filter part number;

filter serial number;

lens part number; and lens serial number.

29. An optical focusing system according to claim 25, further comprising:

storing means for storing computed information based on said downloaded signal having relation to said optics; and restoring means for restoring said stored computed information when said component is inserted again.

30. An optical focusing system according to claim 25, further comprising temperature sensor means providing calibration parameters for compensating optical features.

31. A method to build a modular IR camera comprising the steps of:

a. providing a camera housing having an IR Focal Plane Array comprising a number of detector elements as sensor means, said camera housing having a signal processing system connected to said Focal Plane Array;

b. connecting an absorbent and emitting shielding device removably to said camera housing;

c. mounting a removable optical focusing system focusing an object onto said Focal Plane Array to the combined camera housing and shielding device, said optical focusing system comprising at least one storage element containing calibration information about at least one optical component of the focusing system;

d. downloading a signal based on the stored calibration information; and e. adjusting said infrared camera making use of said calibration information.

32. A method according to claim 31, further comprising:

inserting program means in said processing system adapting signals from said detector elements in said Focal Plane Array to features in surroundings of said FPA;

feeding information about amended features in said surroundings to said program means in said signal processing system.

33. A method according to claim 31, further comprising:

providing a normally open shutter between said optical focusing system and said Focal Plane Array;

providing a shutter close signal;

closing the beam path from said object to said focal plane array after receiving said shutter close signal; and indicating that at least one detector element in said FPA has a steady state signal after that said shutter close signal has been provided; and then making a calibration procedure.

34. A method according to claim 33, wherein said indicating is done by studying a histogram and indicating when a predetermined histogram design is provided from said at least one detector element representing said steady state signal.

35. A method according to claim 31, comprising: providing said absorbent and emitting shielding as a cavity having a cylindrical internal wall and having a first aperture at one end wall of said cylindrical internal wall turned to said FPA and a second aperture at another end wall of said cavity for the bean path from said object to said FPA, said cavity having a relation between the diameter in relation to depth of said cavity being greater than 5 and having a radius being at least 3 times the width of any of said apertures.

36. A method according to claim 35, dimensioning said cavity such that all stray light outside the optical path to said FPA has to be reflected at least three times inside said cavity before it can go through said first aperture to reach said FPA.

37. A method according to claim 35, comprising setting said FPA floating inside said camera housing and in thermal mechanical fix contact with said absorbent shielding.

38. A method according to claim 35, wherein casting said cylindrical wall and said end wall comprising said first aperture as an integral piece.

39. A method according to claim 35, providing said shutter in said other end wall having said second aperture in said shielding.

40. A method according to claim 35, providing a coating with a high absorption coefficient on a cylindrical inside wall of said cavity.

41. A method according to claim 35, providing a wedge geometry of said inner cylindrical walls to increase the absorption inside said cavity.

42. A method according to claim 31, further comprising:
providing each said optical component, in said optical focusing system with one said storage element;
downloading a signal from each said storage element and transferring it to said processing device;
adjusting signals from detector elements in said Focal Plane Array in relation to said downloaded signals.

43. A method according to claim 31, further comprising:
providing a code on said optical component being an exchangeable kind of component;
reading said code; and
adjusting calibration of said IR camera by making use of said code.

44. A method according to claim 31, wherein transforming said information regarding said optics into start information for deriving at least one of the following features:
non-uniformity corrections;
transmission parameters;
vignetting parameters;
compensation matrixes;
special characteristics;
lens part number; and
lens serial number.

45. A method according to claim 31, comprising: storing said computed information based on said downloaded signal having relation to said optics; and restoring said stored information when said component is inserted again.

46. A method according to claim 31, comprising: sensing temperature in said IR camera; and providing calibration parameters for compensating optical features, such as focus, transmission, distance calculations.

47. A method to detect when an optical component in a beam path from an object to a focal plane array (FPA) in an infrared camera influences said adjustment of said infrared camera, and to adjust said infrared camera, comprising the steps of:
providing said optical component with storage means associated to said optical component arranged to hold calibration parameters related to the optical component,
downloading a signal having relation to said calibration parameters,
adjusting said infrared camera making use of said signal.

48. A method according to claim 47, further comprising:
determining whether said optical component is an exchangeable kind of component,
determining whether said specific means is a code provided on said component,
determining whether said code is stored in said infrared camera, and
adjusting a calibration of said infrared camera by making use of said code.

49. A method according to claim 48, wherein said code provides data for deriving at least one of the following features:
non-uniformity corrections;
transmission parameters;
vignetting parameters;
compensation matrixes;
special characteristics;
filter part number;
filter serial number;
lens part number; and
lens, serial number.

50. A method according to claim 48, comprising storing at least one of said downloaded signal having relation to said calibration parameters and features computed by means of said code for said component to be restored when said component is inserted again.

51. A method according to claim 50, characterized by optical or magnetic reading of said code.

52. A method according to claim 47, characterized by temperature sensing for providing calibration parameters for compensating optical features.

53. A method for detecting when a shutter is provided in the beam path from an object to a focal plane array in an IR camera, characterized by
detecting activation of a shutter close signal; and
indicating when said FPA has a predetermined and/or steady state after said activation of said shutter close signal, by studying a histogram and indicating when a predetermined histogram design is provided from said at least one detector element representing said steady state signal.

54. A method for providing shielding in an infrared camera having a focal plane array (FPA) as a recording means for an infrared beam from an object to be monitored, comprising:
providing a cavity having an approximately cylindrical internal wall and having a first aperture at one end wall of said cavity turned to said FPA and a second aperture at another end wall of said cavity for the beam path from said object to said FPA, said cavity having a ratio of depth to radius being at least 1 to 5 and a radius being at least 3times the width of any of said apertures.

55. A method according to claim 54, dimensioning said cavity such that all stray light outside said optical path to said FPA has to be reflected at least three times inside said cavity before it can go through said first aperture to reach said FPA.

56. A method according to claim 54, providing a coating with a high absorption coefficient on a cylindrical inside wall of said cavity.

57. A method according to claim 54, providing a wedge geometry of said inner cylindrical walls to increase said absorption inside said cavity.

58. A method according to claim 54, providing said FPA in thermal mechanical fix contact with said end wall comprising said first aperture.

* * * * *